Patented May 1, 1923.

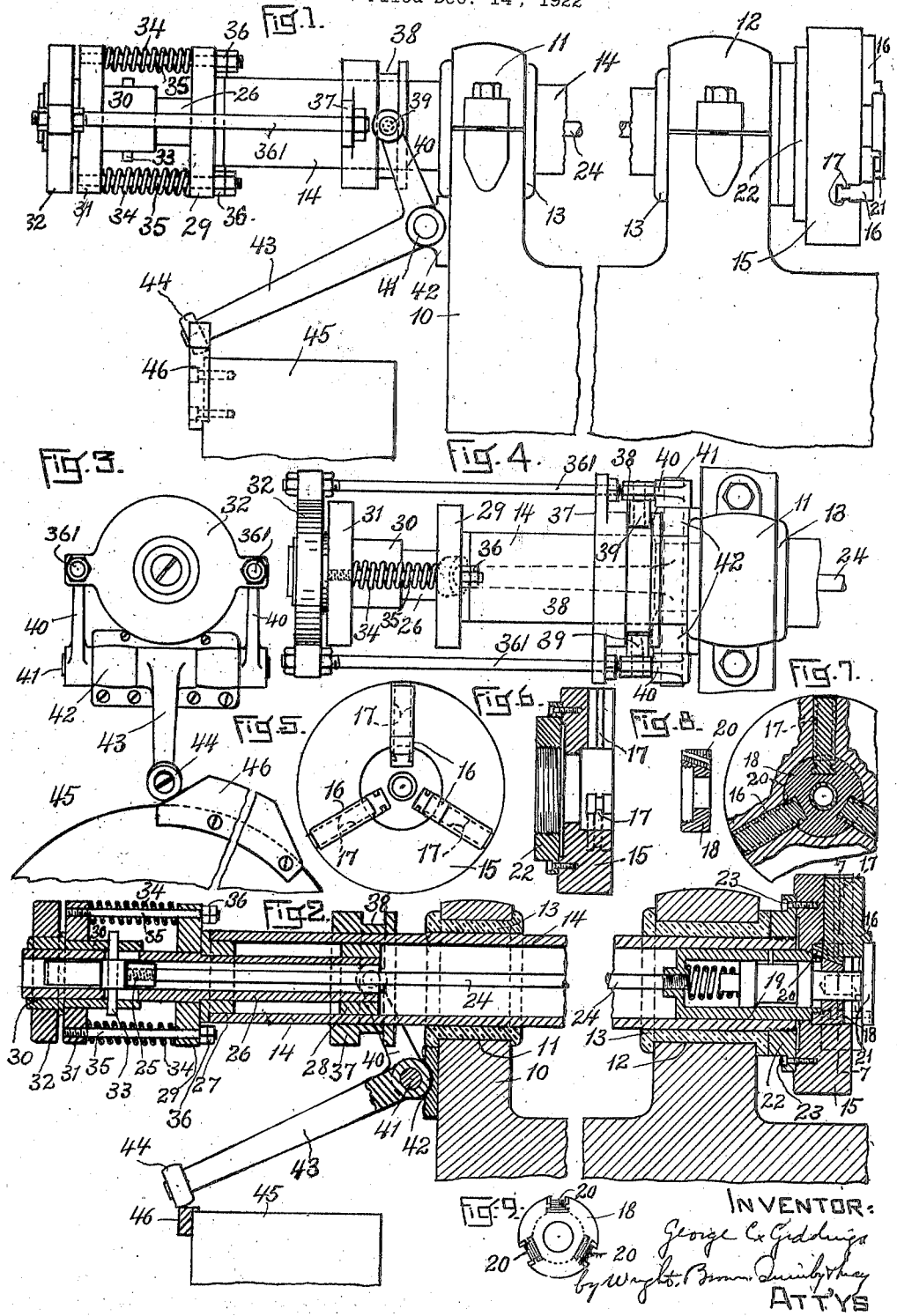

1,453,318

UNITED STATES PATENT OFFICE.

GEORGE C. GIDDINGS, OF SPRINGFIELD, VERMONT.

MECHANICALLY-OPERATED AUTOMATIC CHUCK.

Application filed December 14, 1922. Serial No. 606,959.

*To all whom it may concern:*

Be it known that I, GEORGE C. GIDDINGS, a citizen of the United States, residing at Springfield, in the county of Windsor and State of Vermont, have invented new and useful Improvements in Mechanically-Operated Automatic Chucks, of which the following is a specification.

The nature of this invention is a chuck for automatic machines and its object is to provide for a chuck of this character automatic operating means which are purely mechanical. Heretofore pneumatically operated chucks have been used to a large extent in automatic machines, but such chucks give considerable trouble for the reason that the inevitable fluctuations in the pressure of the compressed air supplied for operating them affects their operation and occasionally a chuck will fail to open or close at the proper time. Such a failure is a serious defect in a machine whose operation is wholly automatic because it is liable to result in the breakage of tools.

My invention overcomes troubles of the sort above mentioned by effecting opening and closing of the jaws of the chuck by mechanism which is certain and invariable in its mode of operation. Preferably my mechanism consists of positive and unyielding means arranged to cause opening of the chuck jaws and springs arranged and operative to close them. A machine containing that embodiment of the invention is shown in the drawings furnished herewith and described in detail in the following specification.

It will be noted, however, that my claim for protection is not limited by the foregoing statement of preference or to the details of the particular machine so illustrated and described, except as required by the appended statements of claim.

In the drawings referred to—

Figure 1 is an elevation of so much of the aforesaid machine as is necessary to illustrate the invention.

Figure 2 is a longitudinal central section of the machine.

Figure 3 is an elevation as seen from the left hand end of Figures 1 and 2.

Figure 4 is a plan view of the mechanism shown in the left hand part of Figures 1 and 2.

Figure 5 is a face view of the chuck.

Figure 6 is an axial section of the chuck, the plan of section passing through the guideway for one of the chuck jaws.

Figure 7 is a cross section taken on line 7—7 of Figure 2.

Figures 8 and 9 are, respectively, an axial section and front elevation of the cam which directly actuates the chuck jaws in their opening and closing movements.

Like reference characters designate the same parts wherever they occur in all of the figures.

The numeral 10 represents a head having bearings 11, 12 provided with bushings or linings 13 in which rotates a tubular spindle 14 carrying on its front end a chuck 15. It is to be understood that a pulley or other driving element is mounted upon the spindle, preferably between the bearings 11 and 12, as is usual with machine tools, said driving element being omitted from the drawings because not necessary to an explanation of the present invention and because the character and mode of application of operative driving means for the spindle are well understood by those skilled in the art.

The chuck is provided with jaws 16, preferably three in number, which are slidably mounted in radial guideways in the chuck head, said guideways having ribs 17 to retain the jaws, as is clearly shown in Figures 1, 6 and 7. A cam 18 for opening and closing the jaws is arranged in the center of the chuck head and is secured to an actuator 19 contained within the forward end of the tubular spindle and adapted to move endwise therein. Said cam has inclined guideways 20 spaced conformably to the chuck jaws into which the inner ends of said jaws enter; and the guideways and jaws have interengaging ribs and surfaces so arranged that when the cam is moved outwardly (that is, to the right with respect to Figures 2 and 6) the jaws are opened and when the cam is moved in the opposite direction the jaws are closed upon the work. The drawings show a work piece 21 gripped by the jaws.

The chuck head is attached to the tubular spindle by means of a ring or collar 22 threaded upon the spindle and to which the chuck is attached by bolts 23.

For moving the actuator back and forth there is provided the following mechanism: A rod 24 is fastened at one end to the actuator 19 and passes thence to a threaded connection, at its other end, with a bar 25 fitted to slide in a tube 26 which is firmly mounted in the spindle by spacing rings 27 and 28, and projects beyond the end of the spindle. Fixed upon the protruding part of said tube, near the end of the spindle, is a plate 29, and slidingly mounted on the outer part of the tube is a sleeve 30 to which are applied plates 31 and 32. A pin 33 passes through the sleeve 30 and the bar 25, thereby completing a rigid connection between the cam ring 18 and the sleeve 30. Springs 34, 34 are interposed between the plates 29 and 31 to exert pressure thereon, tending to push the plate 31 outwardly and retract the cam ring 18. These springs are helical and are guided by rods 35 fastened to the plate 31 and extending freely through holes in the plate 29, carrying nuts 36 on the ends which protrude from the latter plate so as to limit the retracting effect of the springs. These nuts may be adjusted and thereby the closing movement of the chuck jaws may be limited to different points.

The plate 32 is connected by rods 361 to a ring 37 which has a free sliding movement on the tubular spindle and is formed with a groove 38 in which enter studs 39 (preferably provided with anti-friction rollers) projecting from arms 40, 40 which are connected to a rock-shaft 41 mounted in bearings 42 secured to the rear side of the head 10. A third arm 43 is secured to the rock-shaft and carries a trundle roll 44 cooperating with a rotatable cam 45 and with a cam plate 46 thereon. The arms 40, 40 and 43 and the rock-shaft 41 comprise, essentially, a bell crank lever which transmits motion from the cam to the sliding ring 37.

It will thus be seen that when the cam plate passes under the trundle roll 44 the plate 32 and sleeve 30 are moved to the right (in respect to these drawings), thereby so moving the cam ring 18 as to open the chuck jaws. Then, when the cam plate (or equivalent cam protuberance) has passed the roll 44, the springs restore the mechanism to the previous condition and cause closing of the chuck jaws on the newly placed work piece.

It will be understood that where automatic machines embodying the invention here described are used the work pieces are placed in the chuck automatically, but as the means for so placing the work pieces do not form a part of the present invention, they are not here disclosed.

Evidently the mechanism hereinbefore described is positive in its action of opening the chuck jaws, wherefore its operations are certain to be performed uniformly and accurately at each cycle of the machine. In particular, it is impossible for such conditions as fluctuations in air pressure to affect the operation of the chuck opening and closing mechanism in any manner.

Although I have shown the mechanism as being operated positively to open the chuck jaws and through the agency of springs to close said jaws, I may reverse this arrangement and cause the jaws to be opened through the agency of springs and closed by unyielding rigid mechanism, within the scope for which I claim protection for this invention.

What I claim and desire to secure by Letters Patent is:

In an automatic machine tool, a rotatable chuck-carrying spindle, a rotatable and endwise movable chuck actuator contained within said spindle, a tube fixed within the spindle surrounding said actuator and projecting at one end from the spindle, a spring abutment fastened to said tube adjacent to the end of the spindle, a second spring abutment having a sliding engagement on the tube, and being in rigid connection with the chuck actuator, a spring interposed between the two abutments tending to move them apart, a collar surrounding the spindle, with provision for movement endwise thereon, connections between said collar and the second abutment adapted to transmit movement from the former to the latter, in the opposite direction to the force application of said spring to the second abutment, and a cam-controlled operating lever for so moving said collar, the collar having a shoulder, and the lever having a stud adapted to bear upon said shoulder, for imparting movement as described to the collar.

In testimony whereof I have affixed my signature.

GEORGE C. GIDDINGS.